March 7, 1939.　　A. G. KREGECZ　　2,150,070
TELEMETER-TYPE INTERNAL CALIPER
Filed Nov. 2, 1937　　4 Sheets-Sheet 1

March 7, 1939.  A. G. KREGECZ  2,150,070
TELEMETER-TYPE INTERNAL CALIPER
Filed Nov. 2, 1937   4 Sheets-Sheet 2

Inventor
Augustus G. Kregecz,
By A. M. Houghton
his Attorney

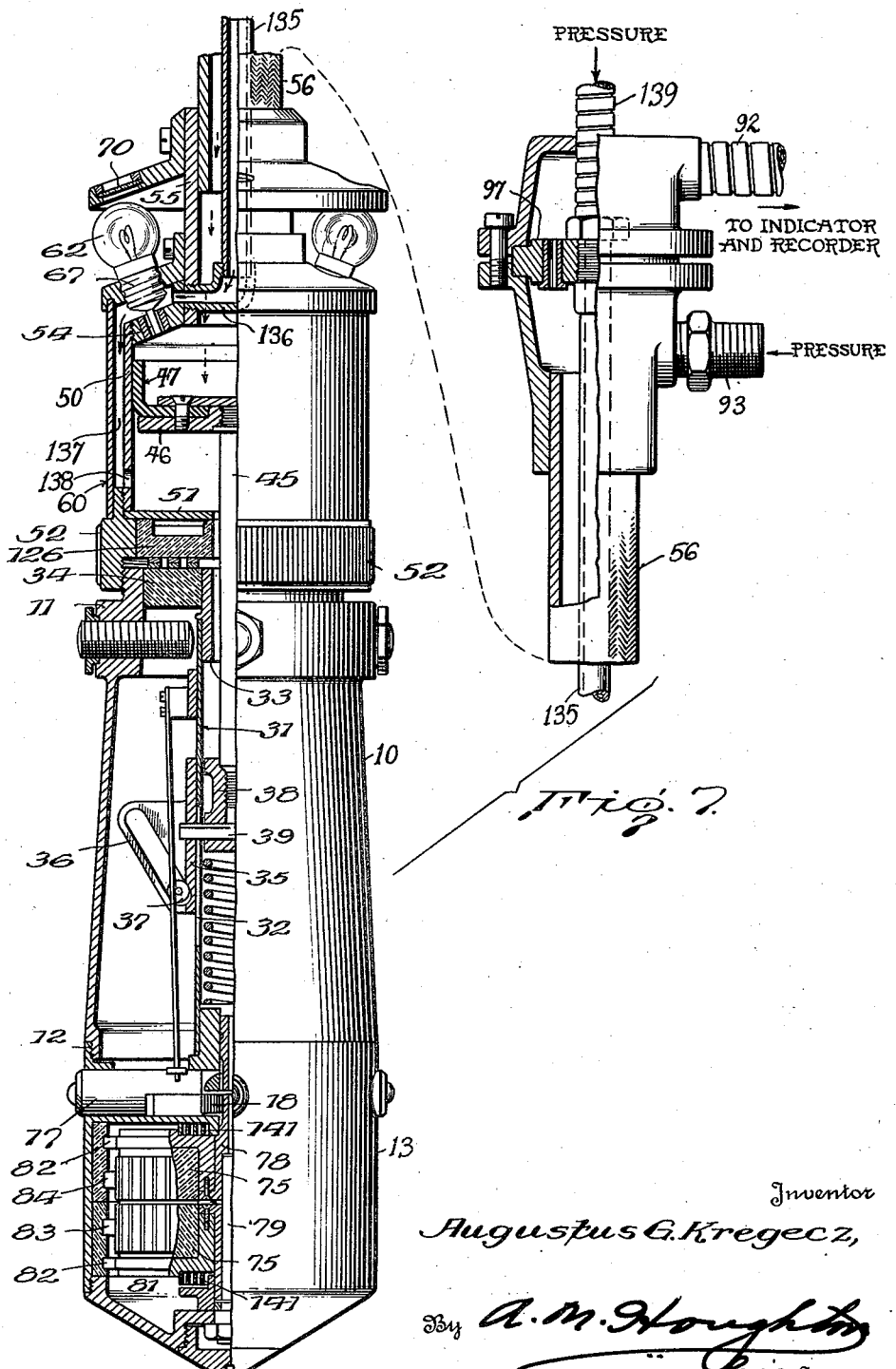

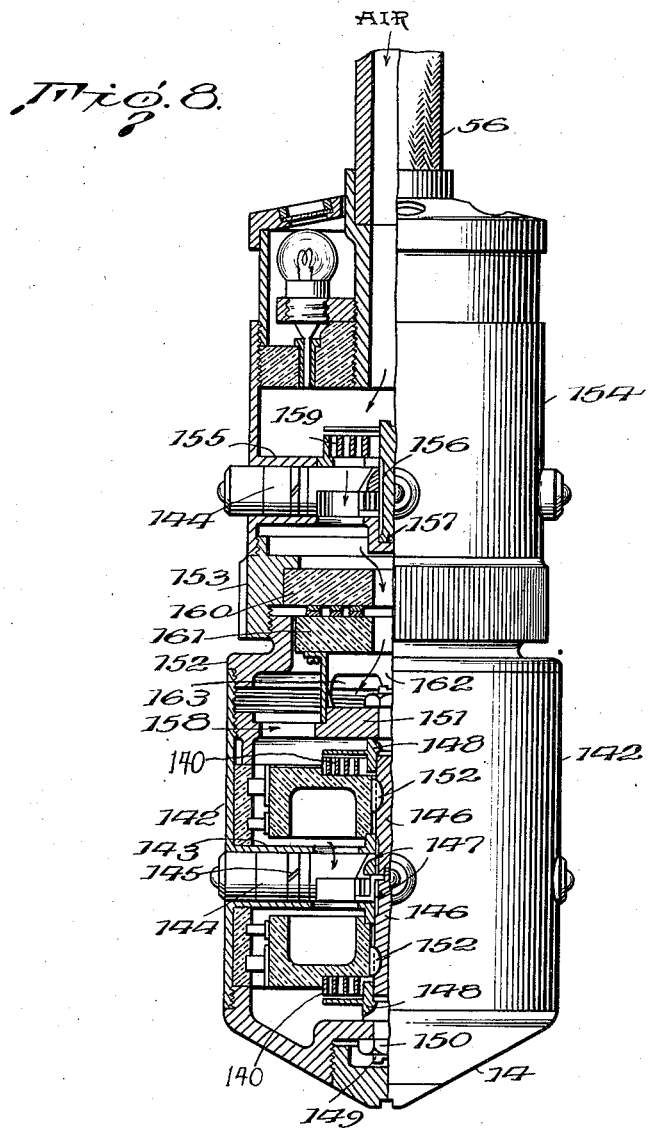

Patented Mar. 7, 1939

2,150,070

UNITED STATES PATENT OFFICE 2,150,070

TELEMETER-TYPE INTERNAL CALIPER

Augustus G. Kregecz, Ben Avon, Pa.

Application November 2, 1937, Serial No. 172,453

6 Claims. (Cl. 177—351)

This invention or discovery relates to telemeter-type internal calipers; and it comprises a caliper adapted to be inserted into elongated tubes or the like and to measure the internal diameter thereof at various points, said caliper comprising a supporting member adapted to enter a tube, a plurality of feelers mounted on the supporting member and arranged for inward and outward movement, indicating or recording means arranged for actuation by the feelers and giving an indication or record of the degree of extension of the feelers, means for moving the supporting member and feelers along the tube, hydraulic means for pressing the feelers firmly against the tube walls, and means for retracting the feelers; all as more fully hereinafter set forth and as claimed.

Oil tube stills, heaters and the like often operate under drastic conditions of temperature and pressure and the condition of the tubes must be carefully ascertained at frequent intervals, to forestall tube failure. In particular, the internal diameter of the tubes must be frequently checked. The diameter may increase due to corrosion or "giving" of the tubes under extreme heat and pressure. Or, it may decrease due to formation of coke or scale. Either condition is dangerous.

Apparatus of the internal caliper type have been devised for measuring tubing internal diameters, but so far as I am aware no apparatus is known which is capable of accurately measuring small cavities or narrow annular depressions in tubes. Local enlargement of the tube bore is particularly apt to occur at certain crucial points, such as the junction of a tube with a shouldered return bend, or at the end of a sleeve liner. Calipering apparatus hitherto known is incapable of accurately showing up these localized enlargements.

Among the objects achieved in the invention are: the provision of telemeter-type internal calipers which are capable of accurately measuring or recording small cavities or other highly localized variations in diameter; the provision of apparatus of this type having feelers adapted to enter small depressions and arranged to be pressed against the tube or drawn away therefrom positively by pneumatic pressure; and the provision of such apparatus arranged to measure two or more diameters simultaneously while being moved through a tube and to give a continuous indication or record thereof.

Figure 2:
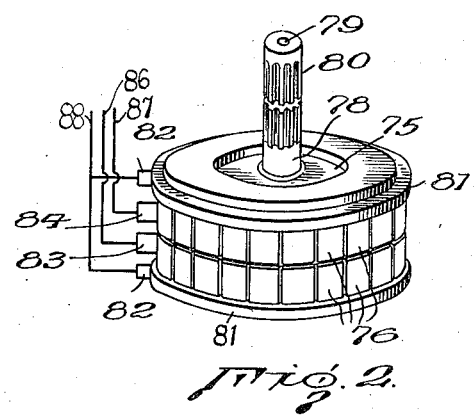
Figure 4:
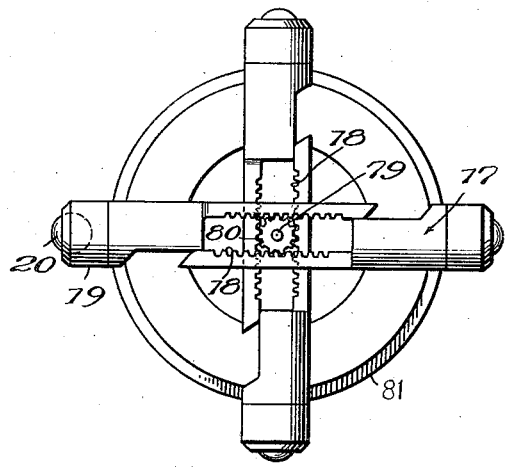
Figure 5:
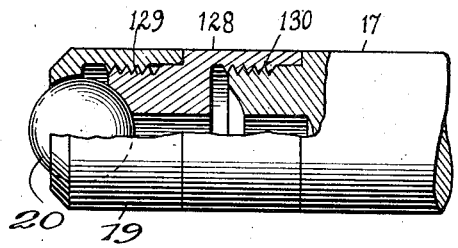
Figure 6:
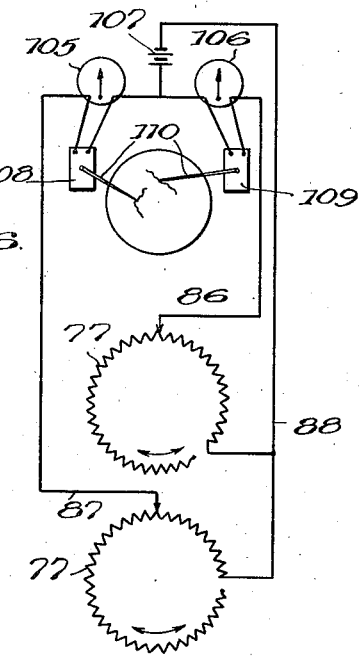
Figure 3:
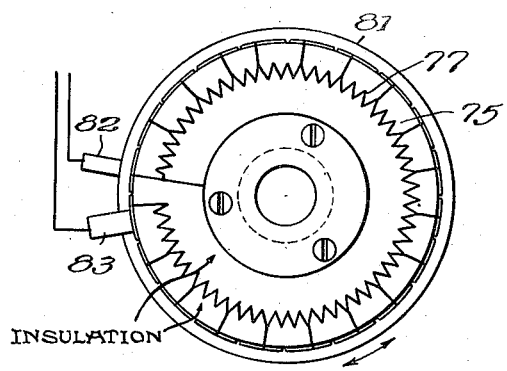

In the accompanying drawings there are shown, more or less diagrammatically, three examples of specific embodiments of apparatus within the purview of the invention. In the drawings, Fig. 1 is a view, partly in elevation and partly in vertical section, of a complete apparatus within the purview of the invention, Fig. 2 is a perspective view of the rheostats of Fig. 1, Fig. 3 is a plan view of the rheostats of Fig. 1, Fig. 4 is a plan view of the feeler assembly of Fig. 1, Fig. 5 shows a modification for securing additional feeler length, Fig. 6 is a circuit diagram, Fig. 7 shows a modification wherein the feelers are both expanded and retracted by pneumatic pressure, and Fig. 8 shows a modification wherein pneumatic pressure is caused to act directly on the feelers.

Figure 1:
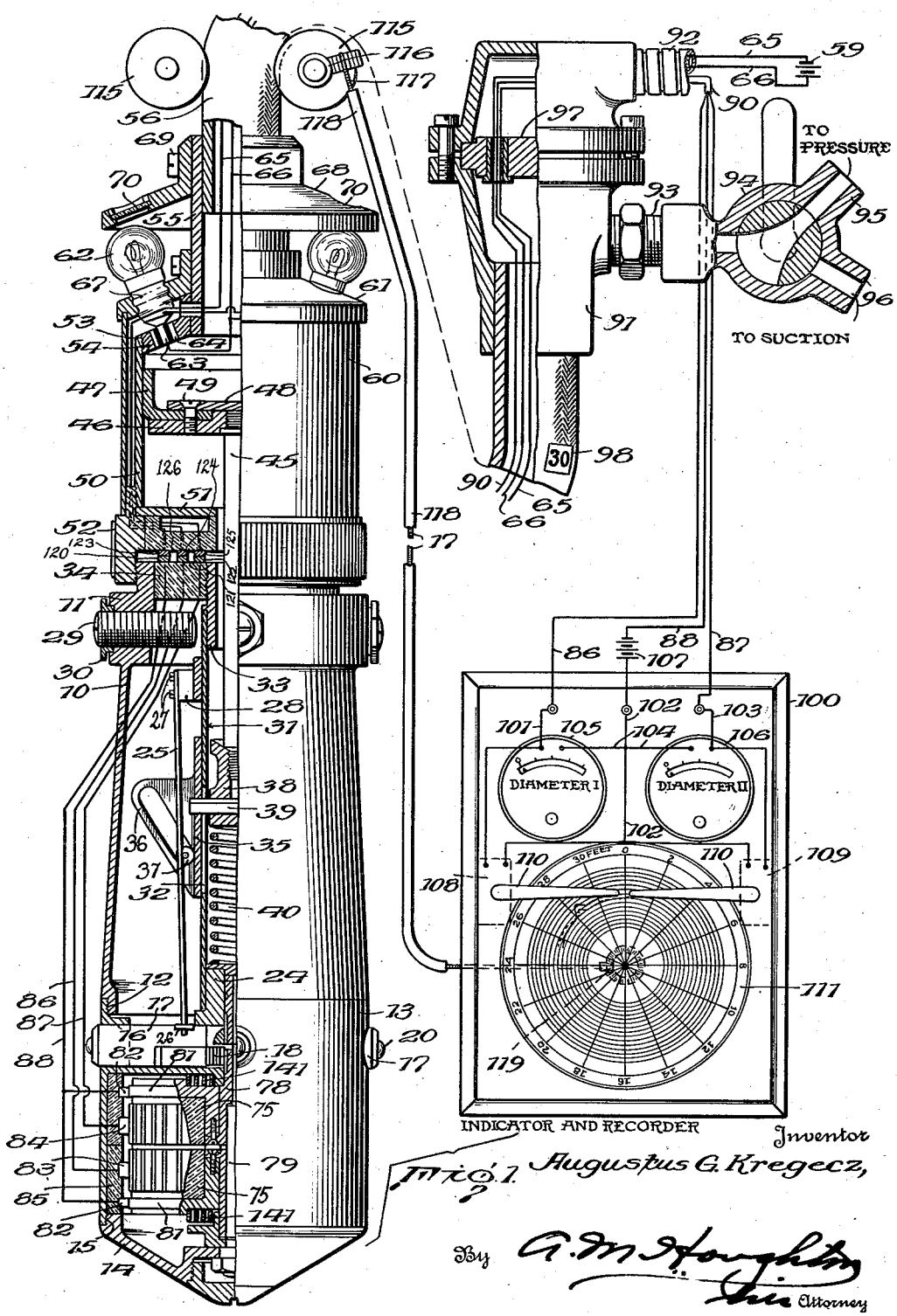

Referring to Fig. 1, there is provided a housing 10, having an annular portion 11 at one end and threaded at the other end, as indicated at 12, for reception of a cylindrical casing 13 having a conical end closure 14 threaded to the casing at 15. Casing 13 has four bores 16, only one of which shows in the figure, each containing a plunger-like feeler 17 shaped as shown in Figs. 1, 4 and 5 and having a rack portion 18 and a threaded socket 19 (Fig. 5) for reception of a hardened ball 20. Each pair of feelers is arranged along a diameter of the casing, and the rack portions of opposite feelers interpenetrate in the manner shown (Figs. 1 and 4) whereby axial twisting of the feelers is restrained. Normally each feeler is held retracted (is drawn inward) by a pair of springs 25, arranged side by side (only one spring shows in Fig. 1) engaging the feeler as indicated at 26, and retained by screws 27 affixed to a fixed standard 28.

A set of four adjustable blunt-end screws 29, threaded into member 11 and locked by nuts 30, center the apparatus approximately and serve as guides to prevent undue canting of the apparatus in the tube.

The feelers are adapted to be expanded by a pneumatic mechanism as follows: a supporting tube 31, slotted at 32, is fastened at one end to a cylindrical member 24 in casing 13 and at the other end to a nipple 33 joined with annulus 11 by a ring 34 (the ring being made of insulating material for reasons hereinafter pointed out). Sliding on this tube is a tubular member or sleeve 35 having four slotted wedges 36 thereon, 90 degrees apart (only one wedge appearing in Fig. 1), the slotted wedges engaging rollers 37 attached to the springs 25. Within the tube 31 is a threaded socket 38 attached to element 35 by a pin 39 sliding in the guide slot 32. The wedge assembly is normally pressed upward, by a coil spring 40 arranged as shown. Threaded into socket 38 is a piston rod 45, carrying a piston 46 having a leather washer 47 fastened thereto by a disk 48 and screws 49. The piston slides in a cylinder 50 having a cylinder head 51 and attached to annulus 11 by a threaded, knurled flange 52, as shown. The upper end of the cylinder is threaded at 53, to accommodate an annulus 54, attached to a tube 55 in communication with an air-tight flexible supporting conduit 56.

Upon admitting air under pressure to the conduit (as described subsequently) the piston is forced down and the feelers are pressed resiliently against the tube wall. Upon release of air, springs 25 retract the feelers.

The cylinder 50 is protected by a tube 60, attached to tube 55 by a flange 61 as shown. In flange 61 are mounted two small lamps 62 alined with one pair of feelers, for the purpose of showing from outside the orientation of the calipers in the tube. Each lamp contacts a pin 63 insulatedly mounted in flange 54 and 64. The electrical connections include two wires, 65 and 66, connected to the pin and to the base 67 of the lamp, as shown, and to a battery 59. The lamps are protected by a conical shield member 68 bolted to tube 55 at 69 and having windows 70 of different color glass. When the caliper is in place in a tube, the lamps are visible to the operator outside.

The position of the feelers is determined electrically by a system as follows: a pair of commutator disks 75 is provided, of insulating material, and having a plurality of metallic contact segments 76 on the periphery. Each set of contacts is connected at equal spacings to a resistance element, diagrammatically indicated at 77 (Fig. 3), embedded in disk 75, so that the disks may be regarded as rotary rheostats. The upper disk is mounted on a hollow, pinion-tooth spindle 78, engaging one pair of feeler racks 18. The lower disk is mounted on an axle 79, passing through the hollow spindle, and carrying a pinion 80 engaging the other pair of feeler racks. Each disk has attached thereto a contact ring 81, the rim of which bears against a stationary brush 82. A pair of fixed brushes 83 and 84 make contact with the annularly arranged elements 76. All the brushes are mounted on a pair of sleeves 85 of insulating material. A pair of wires 86 and 87 lead from brushes 83 and 84, and a single common wire 88 leads from brushes 82.

Wires 86, 87 and 88 are carried up through the housing and into tube 56. In Fig. 1 the wires are shown, for the sake of clarity, as outside the housing for part of their distance, and are shown as joined into a triple cable 90. All the wires, including the lamp wires 65 and 66, are enclosed in tube 56. Wires 86, 87 and 88 are brought through the joint between 11 and 52, by means of three conducting annuli 120, 121 and 122 fixed to insulating member 34, and three similar conducting annuli 123, 124 and 125, carried on an insulating ring 126 mounted in member 52, as shown, and retained in place by disk 51 which is fastened to the ring 126.

The flexible tube 56 is of length appropriate to length of pipe being measured, and may be 30 feet or more in length. At its end is attached a head 91, having a conduit connection 92 for the several wires and an air connection 93, in communication with a three-way valve 94 having connections 95 and 96 for air under pressure and for suction respectively. A sealing disk 97 in the housing prevents air from leaking out through conduit 92. The tube 56 may have feet markings as indicated at 98 along its length.

The rheostat wires 86, 87 and 88 are connected to an indicating and recording apparatus 100. Wires 86, 87 and 88 are connected by wires 101, 102, 103 and 104 to a pair of indicating instruments 105 and 106, which can be calibrated to indicate the tube diameter directly if desired. A battery 107 supplies energy to the circuit. Instruments 105 and 106 are connected respectively in parallel, as shown, to two electrical recording means 108 and 109 of known type, having pen arms 110 arranged to trace a record on a rotating chart 111. The chart is arranged to be driven according to the movement of tube 56, by means of a mechanical transmission comprising stationarily mounted friction rollers 115 engaging tube 56, one roller being geared at 116 to a flexible shaft 117 in a housing 118. The flexible shaft drives chart 111 through gears 119.

The functioning of the electrical circuit will be clear from the simplified circuit diagram (Fig. 6), which requires no detailed description. Upon movement of either pair of feelers, the effective value of the corresponding resistance 77 is changed, and the corresponding instruments (105 and 108, or 106 and 109) register the change.

In operation, the caliper proper is pushed or pulled along the piping by flexible tube 56. Irregularities in the piping are registered by apparatus 100. To retract the feelers, suction can be applied to the cylinder, by turning valve 94, to assist the spring 40 in moving the piston upwards. A spiral spring 141 is provided for each rotary rheostat, to help return it to position upon retraction of the feelers.

The caliper is readily arranged for measuring various sizes of pipe, by means of extension studs 128, having male and female threads 129 and 130, as shown in Fig. 5. One or more extension studs can be inserted in each feeler in the manner shown.

The maximum pressure that can be obtained by suction is 14.7 pounds per square inch, and it is sometimes desired to secure a greater force for operating the feelers than can be applied by suction, without increasing the piston size. Fig. 7 shows a system for accomplishing this object, in which means are provided for applying positive pressure at will to either side of the piston. As shown, an additional air hose is provided at 135, delivering through an elbow 136 to the annular space 137 between elements 50 and 60. An orifice 138 is provided for influx of air to the lower side of the piston. Tube 135 extends through plate 97 in the housing, as shown, and is supplied with air under pressure when desired through a conduit 139. The rest of the apparatus is like that of Fig. 1 and needs no further description.

Fig. 8 shows a modification wherein the feelers are expanded directly by pneumatic pressure. As shown, the caliper comprises a lower cylindrical housing 142, closed at the bottom by a cap 14 as in Fig. 1 and having four cylinders 143 (only one showing in the figure) each containing a feeler 144, generally like the feelers shown in Figs. 1 and 7 but having piston rings 145 thereon so that each feeler acts like a piston sliding in the cylinders. The rack portions of the feelers are arranged as shown in Fig. 4, and each pair of opposed feelers operates, through the two feeler racks, a spindle 146 having pinion teeth 147. The outer ends of the spindles are mounted for rotation in socket members 148, adjustably attached by screws 149 and lock nuts 150, respectively, to cap member 14 and to an annulus 151 in housing 142. A pair of rotary rheostats is provided as in Fig. 1, keyed to the spindles at 152. A pair of spiral springs 140 attached to the rheostats and to socket members 148 provide a restoring tension for the feelers. By adjusting the angular position of the socket members, the restoring tension of the spring can be adjusted. Movement of the feelers causes a change in the rheostat setting as described above and this change is recorded by the circuits described in connection with Figs. 1 to 7.

Annulus 151 is perforated at 158 for passage of air. A flange 152 connects casing 142 with a knurled coupling flange 153 which carries an upper housing 154, having four cylinders 155 containing a set of plungers or feelers 144 identical with the lower set of feelers described. These upper feelers are for centering the caliper in the pipe; though if desired they can be arranged like the lower feelers to give diameter indications. The upper feelers are urged outward by air pressure. A single pinion 156, rotatably mounted at 157 in housing 154, forces the four feelers to move simultaneously, the pinion being urged by a spiral spring 159 to force the feelers inward. Air is supplied to both sets of feelers through conduit 56, which communicates directly with the inside of the housing 154 as shown.

In this embodiment, conducting annuli 120 to 125 are mounted on two annular insulating disks, 160 and 161, as shown. Disk 160 is retained in coupling flange 153, and disk 161 is carried on a sleeve 162, perforated at 163 for air passage, and seated on element 151. The course of air through the apparatus is indicated by arrows. Upon application of air the centering feelers are simultaneously urged outward against the tube wall, and each pair of measuring feelers is separately urged outwardly. Measurement and recording are as in Figs. 1 to 7.

What I claim is:

1. A caliper for measuring the internal diameter of tubes and the like, comprising a body member adapted to enter the tube, a plurality of feelers mounted in pairs on the body member and arranged for movement toward and away from the tube walls, said feelers having small end portions adapted to enter small depressions in the tube walls, electrical means arranged for actuation by the feelers and adapted to indicate the distance between the outer ends of opposite feelers of each pair, means for moving the body member and feelers along inside of the tube, pneumatic means adapted upon actuation to press the feelers firmly against the tubing walls and into depressions in the tube walls, means for supplying fluid under pressure to said pneumatic means, and means for retracting the feelers.

2. A caliper for measuring the internal diameter of tubes and the like, comprising a body member adapted to enter the tube, a plurality of pairs of feelers mounted on the body member and arranged for movement toward and away from the tube walls, said feelers having small end portions adapted to enter small depressions in the tube walls, pneumatic means so constructed and arranged as to move said feelers upon supply of pressure fluid to said pneumatic means, valve means for controlling admission of actuating fluid to the pneumatic means, an electrical circuit including an electrical measuring device and electrical means operated by the feelers and arranged to change a characteristic of the circuit upon operation by the feelers, and means for moving the body member and feelers along the tube.

3. A caliper for measuring the internal diameter of tubes and the like, comprising a body member adapted to enter the tube, at least one pair of movable feelers, means for mounting said feelers on the body member and for guiding the feelers in movement toward and away from the tube wall, a rheostat arranged to be adjusted by said movement of the feelers, pneumatic power means adapted upon actuation to move the feelers outward against the tube walls, means for moving the body member along the tube, valve means for controlling admission of actuating fluid to the pneumatic power means, and an electrical current-responsive means in circuit with the rheostat.

4. A caliper for measuring the internal diameter of tubes and the like, comprising a cylindrical housing adapted to enter the tube, a pair of feelers slidably mounted in the housing along a diameter thereof and movable toward and away from the tube wall, a like pair of feelers arranged at right angles to the first in the same transverse plane and movable independently of the first pair, a pair of rotary rheostats in the housing, a mechanical operating connection between each pair of feelers and one of the rheostats, the two mechanical connections being independent, means in the housing for moving the feelers toward and away from the tubing walls under pneumatic pressure, and means for supplying operating fluid under pressure to said means.

5. A caliper for simultaneously measuring the internal diameters of tubes in at least two different radial directions in the tube, comprising at least two pairs of diametrically opposed, movable feelers adapted to engage the tube walls, means linking each pair of feelers so that their motion is equal and opposite, means for moving each pair of feelers, independently of the other pair, toward and away from the tube walls, housing means enclosing said feelers and moving means, and means registering separately at a distance the instantaneous extension of each pair of feelers.

6. A caliper for simultaneously measuring the internal diameters of tubes in at least two different radial directions, comprising an elongated housing adapted to enter the tube, an elongated flexible member for moving the housing along the tube, at least two pairs of feelers slidably mounted in the housing, all the feelers being substantially in the same plane at right angles to the tube axis, means linking each pair of feelers so that the feelers of each pair move equal and opposite and independently of the movement of the other pair of feelers, means for forcing the feelers outward and retracting them, and means for registering the position of each pair of feelers whereby to determine the tubing diameter.

AUGUSTUS G. KREGECZ.